United States Patent
Dimond et al.

(10) Patent No.: US 12,371,369 B2
(45) Date of Patent: Jul. 29, 2025

(54) GLASS WITH MODIFIED SURFACE REGIONS ON OPPOSING SIDES AND METHODS AND APPARATUSES FOR FORMING THE SAME VIA ELECTRO-THERMAL POLING

(71) Applicant: CORNING INCORPORATED, Corning, NY (US)

(72) Inventors: Timothy Evan Dimond, Corning, NY (US); Christopher William Drewnowski, Corning, NY (US); Charles Thomas McLaren, Elmira, NY (US); Mardochee Reveil, Alexandria, VA (US); Nicholas James Smith, Port Matilda, PA (US); Nicholas Ryan Wheeler, Corning, NY (US); Thomas Michael Zajicek, Big Flats, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/748,381

(22) Filed: May 19, 2022

(65) Prior Publication Data
US 2022/0380253 A1 Dec. 1, 2022

Related U.S. Application Data

(60) Provisional application No. 63/193,334, filed on May 26, 2021.

(51) Int. Cl.
*C03C 23/00* (2006.01)
*C03C 3/087* (2006.01)

(52) U.S. Cl.
CPC ............ *C03C 23/009* (2013.01); *C03C 3/087* (2013.01)

(58) Field of Classification Search
None
See application file for complete search history.

(56) References Cited

U.S. PATENT DOCUMENTS 3,486,995 A   12/1969  Evers
3,811,855 A *  5/1974  Carlson .................. H01J 29/24
                                            422/186.05
(Continued)

FOREIGN PATENT DOCUMENTS

AU       658031 B2    3/1995
EP       0548388 A1   6/1993
(Continued)

OTHER PUBLICATIONS

K. M. Knowles, et al., "Anodic bonding", International Materials Reviews, vol. 51, Issue 5, 2006, pp. 273-311.
(Continued)

*Primary Examiner* — Lisa L Herring
(74) *Attorney, Agent, or Firm* — Kevin M. Able; Daniel J. Greenhalgh

(57) ABSTRACT

A glass substrate according to one or more embodiments is disclosed. The glass substrate includes an alkali-containing bulk, at least one first alkali-depleted region, and at least one second alkali-depleted region. The alkali-containing bulk has a first surface and a second surfaces with the first and second surfaces opposing one another. The at least one first alkali-depleted region extends into the alkali-containing bulk from the first surface. The at least one second alkali-depleted region extends into the alkali-containing bulk from the second surface. The first alkali-depleted region and the second alkali-depleted region are amorphous and have a substantially homogenous composition. The first alkali-depleted region in some embodiments is a first alkali-depleted surface layer that extends across the alkali-containing bulk.
(Continued)

The first alkali-depleted region in some embodiments is plurality of first alkali-depleted regions that are spaced apart from one another.

10 Claims, 9 Drawing Sheets

(56) References Cited

U.S. PATENT DOCUMENTS

| | | | |
|---|---|---|---|
| 5,004,707 | A | 4/1991 | Ross et al. |
| 10,472,271 | B2 | 11/2019 | Dutta et al. |
| 10,800,141 | B2 | 10/2020 | Bartlow et al. |
| 2005/0058423 | A1 | 3/2005 | Brinkmann et al. |
| 2011/0199687 | A1 | 8/2011 | Sellier et al. |
| 2012/0027399 | A1 | 2/2012 | Yeates |
| 2012/0052271 | A1 | 3/2012 | Gomez et al. |
| 2014/0120311 | A1 | 5/2014 | Smith |
| 2015/0111040 | A1 | 4/2015 | Funatsu et al. |
| 2015/0166407 | A1 | 6/2015 | Varshneya et al. |
| 2016/0137548 | A1 | 5/2016 | Cabral et al. |
| 2016/0137549 | A1 | 5/2016 | Meiss et al. |
| 2017/0305787 | A1* | 10/2017 | Gomez ................ C03C 21/002 |
| 2019/0308394 | A1 | 10/2019 | Alkemper et al. |
| 2020/0199018 | A1 | 6/2020 | Davis et al. |
| 2020/0317559 | A1 | 10/2020 | Fan et al. |
| 2021/0135158 | A1 | 5/2021 | Min |
| 2021/0238086 | A1 | 8/2021 | Drewnowski et al. |

FOREIGN PATENT DOCUMENTS

| | | | |
|---|---|---|---|
| EP | 3263535 | A1 | 1/2018 |
| FR | 2929415 | A1 | 10/2009 |
| WO | 2013/191164 | A1 | 12/2013 |
| WO | 2016/187266 | A1 | 11/2016 |
| WO | WO-2020092142 | A1 * | 5/2020 ........... C03C 23/008 |

OTHER PUBLICATIONS

Luo, et al., "Thermal Poling of Soda-Lime Silica Glass With Non-Blocking Electrodes—Part 1: Effects of Sodium Ion Migration and Water Ingress on Glass Surface Structure", J. Am. Ceram. Soc., vol. 99, No. 4, 2016, pp. 1221-1230.

M. Despont, et al., "Fabrication of a silicon-Pyrex-silicon stack by a.c. anodic bonding", Sensors and Actuators A, vol. 55, 1996, pp. 219-224.

Smith N., et al., "Structure and composition of surface depletion layers in poled aluminosilicate glasses", J Am Ceram Soc., Feb. 2019, vol. 102, pp. 3037-3062.

Tervone, A., et al., "Ion-exchanged glass waveguide technology: a review", Optical Engineering, Jul. 2011, vol. 50, No. 7, 071107, pp. 17.

* cited by examiner

GLASS WITH MODIFIED SURFACE REGIONS ON OPPOSING SIDES AND METHODS AND APPARATUSES FOR FORMING THE SAME VIA ELECTRO-THERMAL POLING

CROSS-REFERENCE TO RELATED APPLICATIONS

This application claims the benefit of priority under 35 U.S.C. § 119 of U.S. Provisional Application No. 63/193,334, filed May 26, 2021, the content of which is incorporated herein by reference in its entirety.

FIELD

The disclosure relates to glass substrates with modified surfaces and, more particularly, to methods and systems for forming modified surface regions on opposing sides of glass substrates via electro-thermal poling, and to glass substrates having modified surface regions on opposing sides.

BACKGROUND

Various techniques are used to modify the surfaces of glasses. One such technique is electro-thermal poling or simply thermal poling. Thermal poling is a glass surface processing technique in which electric fields are used to induce ionic migrations through the glass at moderated temperatures, which are typically below the glass transition temperature ($T_g$). Existing thermal poling techniques use direct current (DC) electric fields applied in a fixed direction from anode to cathode across the thickness of a glass article to induce ionic migration through glass materials that have a composition containing network-modifying ions. The predominant effect of conventional thermal poling is the formation of a glass network modifying depletion region within the glass nearest the positive electrode. This region is typically devoid of alkali ions, which have migrated towards the negative electrode, and is commonly referred to as the alkali ion depletion layer. Depending on the electrode configuration, the glass proximate to the negative electrode generally experiences little to no change in composition.

The alkali ion depletion layer has a modified composition compared to the bulk composition of the glass, by which certain properties in the layer can be enhanced or obtained. Potential enhanced properties include chemical, physical, optical, and bioactive properties at the surface and/or near-surface layers. Glass properties are altered by electrochemical effects that occur within a glass containing network modifying ions when exposed to an externally applied electrical potential. Glass properties vary considerably depending on composition. Demonstrations of thermal poling have proved beneficial on a variety of properties on a wide range of parent glass compositions.

One limitation with existing thermal poling techniques that use DC electric fields in a fixed direction to induce ionic migration through the glass is the characteristically asymmetrical nature of the process. Specifically, conventional DC thermal poling only modifies the glass composition on the anode side of the glass. The resulting glass may be susceptible to warp due to asymmetry differences in glass structure (free volume) and coefficient of thermal expansion (CTE) mismatch. Accordingly, it would be desirable to provide a system and method for forming modified surface regions having unique composition and network structure synthesized in situ from parent glass by thermal poling on multiple and/or opposing sides of a glass article or a glass sheet. A glass article or a glass laminate having modified surface regions on opposing sides would also be desirable.

SUMMARY

A first aspect of this disclosure pertains to a glass substrate that includes an alkali-containing bulk, at least one first alkali-depleted region, and at least one second alkali-depleted region. The alkali-containing bulk has a first surface and a second surfaces with the first and second surfaces opposing one another. The at least one first alkali-depleted region extends into the alkali-containing bulk from the first surface. The at least one second alkali-depleted region extends into the alkali-containing bulk from the second surface. The first alkali-depleted region and the second alkali-depleted region are amorphous and have a substantially homogenous composition.

A second aspect of this disclosure pertains to a method of forming a glass substrate with modified surface regions. The method includes providing a glass substrate having a concentration of alkali and opposing surfaces that include a first surface and a second surface. The method further includes reducing the concentration of alkali in at least one first region that extends from the first surface and, near-simultaneously, reducing the concentration of alkali in at least one second region that extends from the second surface. In one or more embodiments, each of the at least one first region with reduced concentration of alkali and the at least one second region with reduced concentration of alkali has a substantially homogenous composition. In one or more embodiments, reducing the concentration of alkali in the at least one first region and the at least one second region includes subjecting the glass substrate to thermal poling.

The positioning of alkali-depleted regions on opposing sides of the glass substrate enables numerous applications including, but not limited to, complex optical devices that take advantage of enhanced control of the refractive index profile across an entire thickness of a glass substrate or sheet, multi-layer glass laminates with opposing alkali-depleted regions, double-sided patterning (enabled by volumetric changes from local alkali depletion) that can be enhanced via etching (due to effects of alkali depletion on etch rates), mechanically-enhanced glass substrates and sheets through coefficient of thermal expansion (CTE) mismatch engineering, optical applications (e.g. antiglare, optical diffuser, metasurfaces), chemical applications (e.g. selective bonding), and other applications.

DETAILED DESCRIPTION

Figure 1:
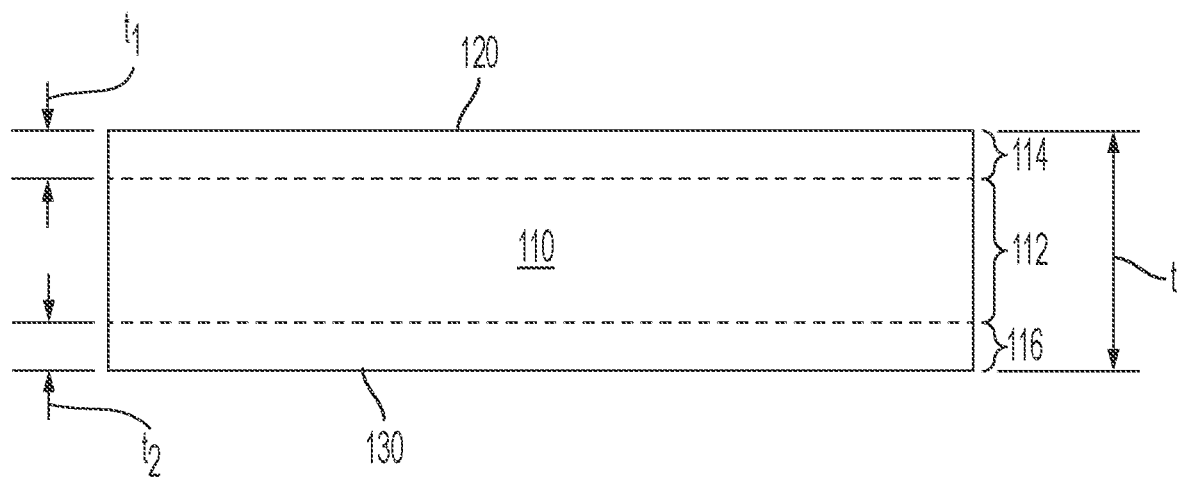
FIG. 1 is a side view of a glass substrate according one or more embodiments.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Relational terms, such as first and second, top and bottom, and the like, are used solely to distinguish one entity or action from another entity or action, without necessarily requiring or implying any actual such relationship or order between such entities or actions.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein, unless defined elsewhere in association with specific terms or phrases, are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms, such as up, down, right, left, front, back, top, bottom, above, below, and the like, are made only with reference to the figures as drawn and are not intended to imply absolute orientation.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, "alkali" means one or more alkali metals and alkaline earth metals and/or oxides thereof and, specifically, the alkali metals and alkaline earth metals and/or oxides thereof present in a substrate. As used herein, "alkali-depleted," used with reference to a volumetric region of a substrate, means the region comprises alkali in a concentration that is less than a concentration present in an alkali-containing bulk (or remainder) of the substrate. In some embodiments, the concentration of alkali in the alkali-depleted surface layer is about 0.5 atomic % or less. In such embodiments, in which the alkali concentration is about 0.5 atomic % or less (e.g., about 0.4 atomic % or less, about 0.3 atomic % or less, about 0.2 atomic % or less, about 0.1 atomic % or less, or about 0.05 atomic % or less, or in the range from about 0.05 atomic % to about 0.1 atomic %), the region can be referred to as substantially alkali-free. Where the alkali concentration is less than about 0.05 atomic % or less, the region can be referred to as alkali-free.

As shown in FIG. 1, a first aspect of this disclosure pertains to a glass substrate 110 including an alkali-containing bulk 112, at least one first alkali-depleted region 114, and at least one second alkali-depleted region 116. The first alkali-depleted region 114 extends into the alkali-containing bulk 112 from a first surface 120 of the glass substrate 110. The second alkali-depleted region 116 extends into the alkali-containing bulk 112 from a second surface 130 of the glass substrate 110. The first surface 120 and the second surface 130 are on opposite sides of the glass substrate 110 in the embodiments shown in the figures. As used herein, opposite or opposing sides or surfaces of a glass substrate (e.g., a glass article, glass sample, glass laminate, glass sheet, glass ribbon, etc.) means sides or surfaces (or major surfaces) that are defined by the glass substrate and face away from one another. In some embodiments, the sides or surface (or major surfaces) are substantially planar surfaces that face away from one another, for example, approximately 180° away from one another relative to directions normal to the planar surfaces.

In one or more embodiments, as shown in FIG. 1, the first alkali-depleted region 114 is a first alkali-depleted surface layer that extends laterally across an entire extent of the alkali-containing bulk 112 and defines the first surface 120. In one or more embodiments, as shown in FIG. 1, the second alkali-depleted region 116 is a second alkali-depleted surface layer that extends laterally across an entire extent of the alkali-containing bulk 112 and defines the second surface 130. In embodiments that include the first alkali-depleted surface layer and the second alkali-depleted surface layer, the alkali-containing bulk 112 is disposed entirely between the first alkali-depleted surface layer and the second alkali-depleted surface layer when viewed in a thickness direction oriented approximately perpendicular to the first and second surfaces 120, 130. In this disclosure, an alkali-depleted surface "layer" possesses and/or exhibits the same or similar features or attributes described with respect to an alkali-depleted "region" unless otherwise indicated.

The alkali-containing bulk 112 can include any one or more of alkali-metal oxides selected from $Li_2O$, $Na_2O$, $K_2O$, $Rb_2O$, and $Cs_2O$ and alkaline-earth metal oxides selected from BeO, MgO, CaO, SrO, BaO, and RaO. In one or more embodiments, the first alkali-depleted region 114 and the second alkali-depleted region 116 can be substantially alkali-free or alkali free. The first alkali-depleted region 114 and the second alkali-depleted region 116 can be described, respectively, as an aluminosilicate region that exhibits a composition that differs from the alkali-containing bulk 112 and concurrently exhibits homogeneity in terms of composition and/or atomic structure within and throughout the region. The first alkali-depleted region 114 and the second alkali-depleted region 116 are integral to the glass substrate 110 and are not coatings or additions to the bulk 112.

As shown in FIG. 1, the glass substrate 110 can have a substrate thickness t between the first surface 120 and the second surface 130, the first alkali-depleted region 114 can have a first thickness $t_1$ starting from the first surface 120, and the second alkali-depleted region 116 can have a second thickness $t_2$ starting from the second surface 130. The substrate thickness t, the first thickness $t_1$, and the second thickness $t_2$ can be in the range from about 10 nm to about 10,000 nm, from about 10 nm to about 900 nm, from about 10 nm to about 800 nm, from about 10 nm to about 700 nm, from about 10 nm to about 600 nm, from about 10 nm to about 500 nm, from about 50 nm to about 1000 nm, from about 100 nm to about 1000 nm, from about 200 nm to about 1000 nm, from about 250 nm to about 1000 nm, from about 300 nm to about 1000 nm, from about 400 nm to about 1000 nm, or from about 500 nm to about 1000 nm. In some embodiments, the substrate thickness t, the first thickness $t_1$, and the second thickness $t_2$ can be in the range from about 0.1 mm to about 3.0 mm (e.g., from about 0.3 mm to about 3 mm, from about 0.4 mm to about 3 mm, from about 0.5 mm to about 3 mm, from about 0.55 mm to about 3 mm, from about 0.7 mm to about 3 mm, from about 1 mm to about 3 mm, from about 0.1 mm to about 2 mm, from about 0.1 mm to about 1.5 mm, from about 0.1 mm to about 1 mm, from about 0.1 mm to about 0.7 mm, from about 0.1 mm to about 0.55 mm, from about 0.1 mm to about 0.5 mm, from about 0.1 mm to about 0.4 mm, from about 0.3 mm to about 0.7 mm, or from about 0.3 mm to about 0.55 mm).

In one or more embodiments, the first thickness $t_1$ and the second thickness $t_2$ are less than the substrate thickness t. The first thickness $t_1$ and the second thickness $t_2$ in embodiments can be about the same such that the glass substrate 110 is symmetrical with respect to the first thickness $t_1$ and the second thickness $t_2$ about a symmetry plane SP passing through the glass substrate 110. As used herein, a "symmetry plane" is a plane oriented substantially normal to the substrate thickness t and positioned at approximately one half the substrate thickness. The first thickness $t_1$ and the second thickness $t_2$ in embodiments can be different such that the glass substrate 110 is asymmetrical with respect to the first thickness $t_1$ and the second thickness $t_2$ about the symmetry plane SP. In embodiments in which the first thickness $t_1$ and the second thickness $t_2$ are different, the first thickness $t_1$ can be larger than the second thickness $t_2$, or the second thickness $t_2$ can be larger than the first thickness $t_1$.

In one or more embodiments, the first alkali-depleted region 114 and the second alkali-depleted region 116 each have a substantially homogenous composition. As used herein, the phrase "substantially homogeneous composition" refers to a composition that does not exhibit any phase separation or very little phase separation and/or does not include portions with a composition differing from other portions. In some embodiments, the composition of the first alkali-depleted region 114 is substantially the same along the first thickness $t_1$, and the composition of the second alkali-depleted region 116 is substantially the same along the second thickness $t_2$. In other embodiments, the composition of the first alkali-depleted region 114 is substantially the same along its entire volume, and the composition of the second alkali-depleted region 116 is substantially the same along its entire volume.

In one or more embodiments, the first alkali-depleted region 114 and the second alkali-depleted region 116 are substantially free of crystallites and/or are substantially amorphous. For example, in some embodiments, the first alkali-depleted region 114 and the second alkali-depleted region 116 each include less than about 1 volume % crystallites.

In one or more embodiments, the first alkali-depleted region 114 and the second alkali-depleted region 116 are substantially free of hydrogen. Such hydrogen can be present in the form of $H^+$, $H_3O^+$, $H_2O$ or combinations therefrom. In some embodiments, the first alkali-depleted region 114 and the second alkali-depleted region 116 each include about 0.1 atomic % hydrogen or less (e.g., about 0.08 atomic % hydrogen or less, about 0.06 atomic % hydrogen or less, about 0.05 atomic % hydrogen or less, about 0.04 atomic % hydrogen or less, about 0.02 atomic % hydrogen or less, or about 0.01 atomic % hydrogen or less).

In one or more embodiments, the first alkali-depleted region 114 and the second alkali-depleted region 116 are substantially free of non-bridging oxygens, and the alkali-containing bulk 112 comprises non-bridging oxygens and bridging oxygens. An alkali-depleted region may also be present or formed when the alkali-containing bulk 112 is substantially free of non-bridging oxygens.

In one or more embodiments, the alkali-containing bulk 112, the first alkali-depleted region 114, and the second alkali-depleted region 116 comprise $Al_2O_3$ and $SiO_2$. In some embodiments, the first alkali-depleted region 114 and the second alkali-depleted region 116 comprise $Al_2O_3$ in the range from about 1 mol % to about 50 mol %. In some embodiments, the amount of $Al_2O_3$ may be in the range from about 1 mol % to about 45 mol %, from about 1 mol % to about 40 mol %, from about 1 mol % to about 30 mol %, from about 1 mol % to about 25 mol %, from about 5 mol % to about 50 mol %, from about 10 mol % to about 50 mol %, from about 20 mol % to about 50 mol %, from about 30 mol % to about 50 mol %, from about 1 mol % to about 45 mol %, 5 mol % to about 35 mol %, or from about 3 mol % to about 34 mol %.

In one or more specific embodiments, the first alkali-depleted region 114 and the second alkali-depleted region 116 comprise a binary $Al_2O_3$—$SiO_2$ composition, though other non-alkali components may be included.

The glass substrate 110 prior to thermal poling treatment and the alkali-containing bulk 112 may include a variety of glass compositions. Such glass compositions used in the glass substrate prior to thermal poling treatment and present in the alkali-containing bulk 112 after thermal poling treatment may be referred to herein as a "precursor" glass, a precursor glass composition, or a parent glass. The precursor glass compositions may range from simple alkali or alkaline-earth silicates, aluminosilicates, borosilicates, or boroaluminosilicates, to more complex multicomponent glasses that can form an altered region and/or surface layer by the process of thermal poling. Some examples of precursor glass compositions that can be used for the glass substrate 110 and the alkali-containing bulk 112 are provided in U.S. Pat. No. 10,472,271, issued Nov. 12, 2019, which is hereby incorporated by reference in its entirety as if fully set forth herein.

The glass substrate 110 after thermal poling treatment exhibits several attributes that are changed relative to the same attributes prior to thermal poling treatment. In some embodiments, the first alkali-depleted region 114 and the second alkali-depleted region 116 (collectively, "opposing alkali-depleted regions") each comprise a region refractive index that is less than the refractive index of the alkali-containing bulk 112. Such embodiments can exhibit an anti-reflection effect due to the lower region refractive index of the opposing alkali-depleted regions.

In some embodiments, the glass substrate 110 after thermal poling can exhibit an average strain-to-failure at the first surface 120 and/or at the second surface 130 that is greater than that of the glass substrate prior to thermal poling. In some embodiments, the glass substrate having an alkali-containing bulk and opposing alkali-depleted regions can exhibit increased elastic modulus (or Young's modulus) as compared to the alkali-containing bulk (or the glass substrate before the opposing alkali-depleted regions are formed). In some embodiments, the hardness of the glass substrate 110 after thermal poling is greater than the hardness of the alkali-containing bulk 112. Unless otherwise specified, the hardness described herein refers to Vickers hardness. The attribute changes exhibited by the glass substrate 110 after thermal poling are equal or comparable to those attribute changes described in U.S. Pat. No. 10,472, 271 referenced above.

In one or more embodiments, the glass substrate may be strengthened or non-strengthened. In some embodiments, thermal poling can be performed on strengthened glass substrates such that the alkali-depleted surface layer is formed on top of a compressive stress region and/or layer in the strengthened glass substrate.

The glass substrate can be substantially planar or sheet-like, although other embodiments may utilize a curved or otherwise shaped or sculpted substrate. The glass substrate can be substantially optically clear, transparent and free from light scattering. In such embodiments, the glass substrate can exhibit an average total transmittance over the optical wavelength regime of about 85% or greater, about 86% or greater, about 87% or greater, about 88% or greater, about 89% or greater, about 90% or greater, about 91% or greater or about 92% or greater.

Additionally, or alternatively, the physical thickness of the glass substrate can vary along one or more of its dimensions for aesthetic and/or functional reasons. For example, the edges of the glass substrate can be thicker as compared to more central regions of the glass substrate. The length, width, and physical thickness dimensions of the glass substrate can also vary according to the application or use.

The glass substrate can be provided by various forming methods, including float glass processes and down-draw processes such as fusion draw and slot draw.

The glass substrate including the alkali-containing bulk and opposing alkali-depleted regions described herein exhibit improved corrosion resistance, improved diffusion barrier properties, higher hardness and/or elastic-modulus values, greater fatigue resistance, and/or improved damage resistance (via so-called anomalous deformation).

In some embodiments, the opposing alkali-depleted regions also block ion diffusion either into the glass substrate or from the alkali-containing bulk to the opposing alkali-depleted regions.

The glass substrates described herein may exhibit an increased chemical durability in terms of resistance to dissolution in acid, water or base. In some examples, the glass substrate exhibits a decrease in dissolution rates in acid, water, or base.

A second aspect of this disclosure pertains to a method of forming a glass substrate with modified surface regions. The method includes providing a glass substrate 110 having a concentration of alkali and opposing surfaces that include a first surface 120 and a second surface 130. The method further includes reducing the concentration of alkali in at least one first region 114 extending from the first surface 120 and, near-simultaneously, reducing the concentration of alkali in at least one second region 116 extending from the second surface 130. In one or more embodiments, each of the at least one first region 114 with reduced concentration of alkali and the at least one second region 116 with reduced concentration of alkali has a substantially homogenous composition. In one or more embodiments, reducing the concentration of alkali in the at least one first region 114 and the at least one second region 116 includes subjecting the glass substrate 110 to thermal poling.

As used herein, the term "near-simultaneously" used in the context of thermal poling according to the one or more embodiments disclosed herein means the action or mechanism of reducing the concentration of alkali in the second alkali-depleted region commences successively and immediately following the action or mechanism of reducing the concentration of alkali in the first alkali-depleted region. More specifically, when thermal poling includes applying an alternating electrical potential difference to a glass substrate using an electrical source with an alternating waveform that defines a duty cycle, reducing the concentration of alkali in the second alkali-depleted region commences successively and immediately following the portion of the duty cycle that applies a positive electrical bias to the first side/surface of the glass substrate. For example, when thermal poling using an AC waveform configured as a 50/50 duty cycle sinusoidal wave at a working frequency of 1 Hz, the first half-cycle of the 50/50 duty cycle reduces the concentration of alkali in the first alkali-depleted region for about 0.5 seconds while the second half-cycle of the 50/50 duty cycle of reduces the concentration of alkali in the second alkali-depleted region for about 0.5 second. As such, the near-simultaneously reducing the concentration of alkali in the second alkali-depleted region commences about 0.5 seconds after reducing the concentration of alkali in the first alkali-depleted region commences and/or successively and immediately following the end of the first half-cycle.

Prior to thermal poling treatment, the first surface 120 and the second surface 130 of the glass substrate 110 can be cleaned or treated to remove typical contamination that can accumulate after forming, storage, and shipping. Alternatively, the glass substrate 110 can be subjected to thermal poling treatment immediately after glass forming to eliminate the accumulation of contamination.

Figure 2:
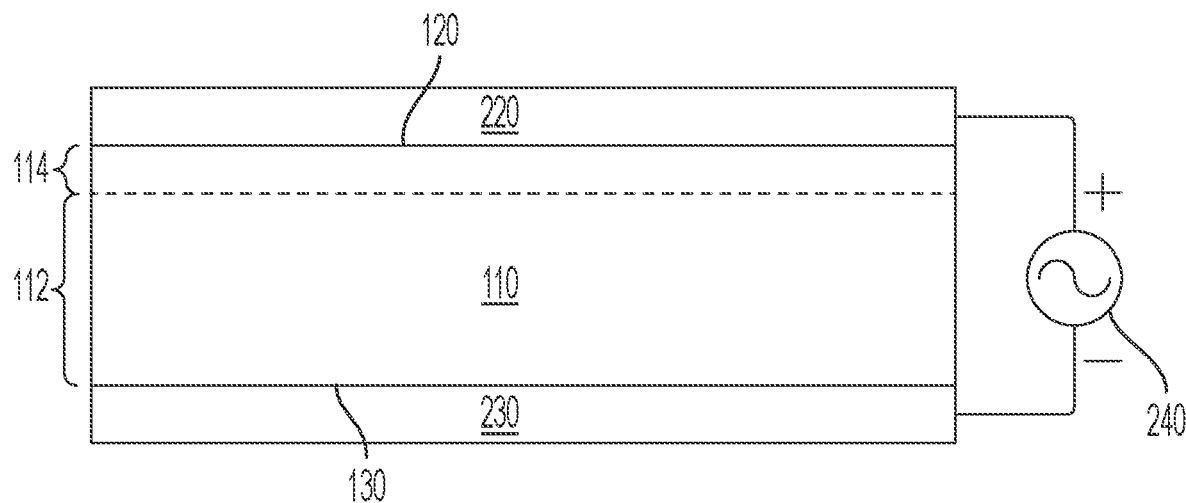
FIG. 2 is a side view of a first modified surface layer formed in a surface of the glass substrate of FIG. 1 during a thermal poling process according to one or more embodiments.
Figure 3:
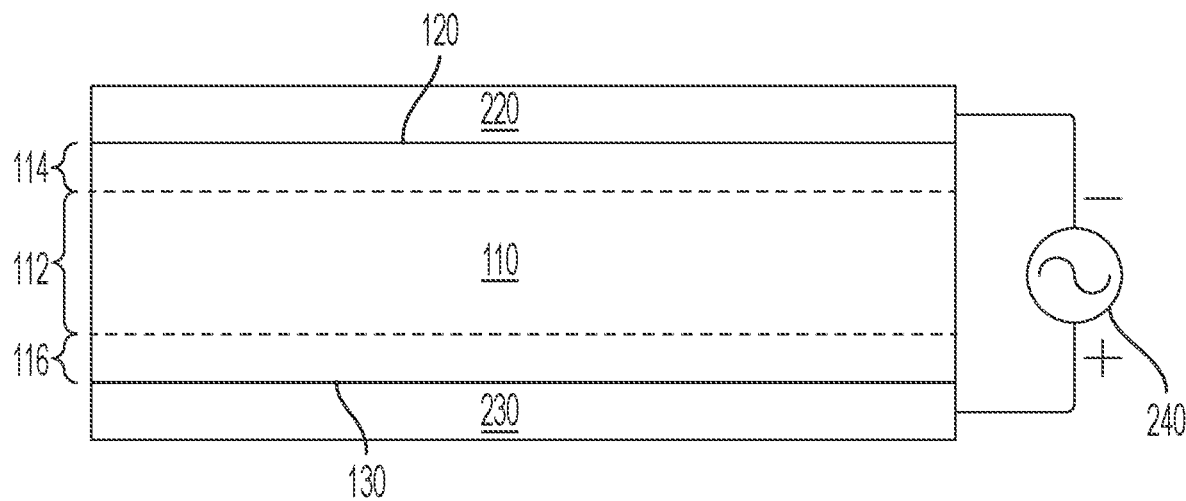
FIG. 3 is a side view of a second modified surface layer formed in an opposite surface of the glass substrate of FIG. 1 near-simultaneously with formation of the first modified surface layer during the thermal poling process.

FIGS. 2 and 3 are side views of modified surface layers formed in opposing surfaces of the glass substrate of FIG. 1 during thermal poling according to one or more embodiments. As shown in the figures, thermal poling can include contacting a first electrode 220 to the first surface 120 of the glass substrate 110 and contacting a second electrode 230 to the second surface 130 of the glass substrate 110. Once the first electrode 220 and the second electrode 230 are positioned on the glass substrate 110, thermal poling further includes applying an alternating electrical potential difference 240 to the glass substrate 110 such that the first electrode 220 and the second electrode 230 are alternatingly positively-biased relative to the glass substrate 110. The alternating positive-bias of the first electrode 220 and the second electrode induces alkali depletion in the at least one first region 114 and the at least one second region 116, respectively.

In embodiments in which the first alkali-depleted region is a first alkali-depleted surface layer 114, as shown in FIGS. 1-3, the first electrode 220 is configured to cover substantially all the first surface 120 for which it is in contact. Similarly, in embodiments in which the second alkali-depleted region is a second alkali-depleted surface layer 116, as shown in FIGS. 1 and 3, the second electrode 230 is configured to cover substantially all the second surface 130 for which it is in contact.

In one or more embodiments, a first electrode material of the first electrode 220 is substantially more conductive than the glass substrate 110 at a poling temperature to provide field uniformity over the first surface 120. It is also desirable that the first electrode material is relatively oxidation resistant to minimize the formation of an interfacial oxide compound that could cause sticking of the glass substrate 110 to the first electrode 120. A second electrode material of the second electrode 230 is likewise substantially more conductive than the glass substrate 110 at the poling temperature to provide field uniformity over the second surface 130. The second electrode material can be relatively oxidation resistant to minimize the formation of an interfacial oxide compound that could cause sticking of the glass substrate 110 to the second electrode 130.

In some embodiments, the first electrode material of the first electrode 220 and the second electrode material of the second electrode 230 can be the same. In other embodiments, the first electrode material and the second electrode material can be different. Exemplary electrode materials for the first electrode 220 and/or the second electrode 230 can include carbon, stainless steel, one or more noble metals (e.g., Au, Pt, Pd, etc.), one or more oxidation-resistant, conductive films (e.g., TiN, TiAlN, etc.), or combinations thereof. The electrode materials for the first electrode 220 and/or the second electrode 230 can also be selected to provide desired blocking conditions for thermal poling as described herein.

In one or more embodiments, the first electrode 220 and the second electrode 230 are separate components that are brought into contact with the glass substrate 110, and thus can be separated after processing without complex removal steps. The electrodes can generally comprise a bulk material, but can take the form of a thin film, for example, a conductive thin film that is deposited on the glass substrate to serve as an electrode.

The curvature and/or flatness of the glass substrate 110 and the first electrode 220 should ideally be matched to provide for reasonably intimate contact at the interface over the first surface 120. Similarly, the curvature and/or flatness of the glass substrate 110 and the second electrode 230 should ideally be matched to provide for reasonably intimate contact at the interface over the second surface 130. However, even if initial contact is not intimate, the electrostatic charge at the interface when voltage is applied will tend to pull the surfaces at the interface into intimate contact.

With continued reference to FIGS. 2 and 3, thermal poling can include applying the alternating electrical potential difference (such as voltage 240) to the glass substrate 110 using an electrical source (current or voltage) with an alternating waveform that defines a duty cycle for thermal poling the glass substrate 110. FIG. 2 illustrates a first half-cycle of the duty cycle in which the first electrode 220 is positively-biased relative to the glass substrate 110 to induce alkali depletion at the first surface 120 of the glass substrate 110. As shown, this first-half cycle initiates formation of the at least one first alkali-depleted region 114 into the alkali-containing bulk 112 from the first surface 120. The at least one second alkali-depleted region 116 (FIG. 1) is not yet formed since the electrical potential difference has not been reversed in the configuration shown in FIG. 3.

FIG. 3 illustrates a second half-cycle of the duty cycle in which the second electrode 230 is positively-biased relative to the glass substrate 110 to induce alkali depletion at the second surface 120 of the glass substrate 110. As shown, this second-half cycle initiates formation of the at least one second alkali-depleted region 116 into the alkali-containing bulk 112 from the second surface 130. The formation of both the first alkali-depleted region 114 and the second alkali-depleted region 116 has been initiated to some degree at the completion of the first full cycle of the duty cycle as depicted in the configuration shown in FIG. 4.

In some embodiments, the alternating electrical potential difference 240 is applied to the glass substrate 110 using a time-varying or "pulsed" direct current (DC) waveform. In such embodiments, the duty cycle is configured to split the time between the DC voltage orientation across the glass substrate 110. This repeating duty cycle alters the polarity of the first and second electrodes 220, 230 from anode to cathode in a repeating fashion, effectively generating a square alternating current (AC) waveform.

In some embodiments, the alternating electrical potential difference 240 is applied to the glass substrate 110 using an AC waveform with a repeating duty cycle. One advantage of using an AC waveform is that the waveform can be customized based on the composition of the glass substrate 110 and the desired first thickness $t_1$ for the first alkali-depleted region 114 and the desired second thickness $t_2$ of the second alkali-depleted region 116. Since the electrical properties of the glass substrate are frequency dependent, the AC waveform can be chosen in a manner that optimizes the dielectric response of the glass. The working frequency range for thermal poling using an AC waveform exists below the frequency independent resistivity regime for DC conduction of glass. This lower frequency range is referred to as electrode polarization regime.

In one or more embodiments, the working frequency range is from about 0.001 Hz to about 500 Hz, from about 0.001 Hz to about 5 Hz, from about 0.001 Hz to about 2.5 Hz, from about 0.001 Hz to about 1 Hz, from about 0.001 Hz to about 0.9 Hz, from about 0.001 Hz to about 0.8 Hz, from about 0.001 Hz to about 0.7 Hz, from about 0.001 Hz to about 0.6 Hz, from about 0.001 Hz to about 0.5 Hz, from about 0.001 Hz to about 0.4 Hz, from about 0.001 Hz to about 0.3 Hz, from about 0.001 Hz to about 0.2 Hz, from about 0.001 Hz to about 0.1 Hz, from about 0.01 Hz to about 5 Hz, from about 0.01 Hz to about 2.5 Hz, from about 0.01 Hz to about 1 Hz, from about 0.02 Hz to about 1 Hz, from about 0.03 Hz to about 1 Hz, from about 0.04 Hz to about 1 Hz, from about 0.05 Hz to about 1 Hz, from about 0.06 Hz to about 1 Hz, from about 0.07 Hz to about 1 Hz, from about 0.08 Hz to about 1 Hz, from about 0.09 Hz to about 1 Hz, or from about 0.1 Hz to about 1 Hz.

Prior to applying the alternating electrical potential difference 240, the method can include heating the glass substrate 110, the first electrode 2210, and the second electrode 230 (e.g., the stack including first electrode/glass substrate/second electrode) to a temperature below the glass transition temperature ($T_g$) of the glass substrate 110. In some embodiments, the glass substrate 110 and the first and second electrodes 220, 230 can be heated to a process temperature in the range from about 25° C. to about $T_g$, from about 50° C. to about 200° C., or from about 100° C. to about 300° C. In some embodiments, equilibrium at the desired process temperature can be useful in thermal poling to ensure temperature uniformity. In some embodiments, the glass substrate 110, the first electrode 220, and the second electrode 230 are heated concurrently together in the stack. In other embodiments, the glass substrate 110, the first electrode 220, and the second electrode 230 can be heated separately and then positioned in the stack for thermal poling.

In one or more embodiments, thermal poling includes applying the alternating electrical potential difference to the glass substrate 110 under blocking conditions. In some embodiments, the blocking conditions are fully blocking conditions, which means no significant supply of ions passes through the surface of the glass substrate at the interface between the glass substrate and electrode during thermal poling. For instance, the electrodes can be formed from a material that is substantially ion-blocking, such as platinum (Pt) or stainless steel. In some embodiments, the blocking conditions are partially blocking conditions in which some ionic species can pass through the interface, such as when hydrogen-related species are the primary species of ingress at the anodic interface. Additionally, or alternatively, the glass substrate can be subjected to thermal poling under vacuum, in an inert gas environment (e.g., dry $N_2$), or a permeable gas environment (e.g., He) to provide blocking conditions. In some embodiments, thermal poling includes applying the alternating electrical potential difference to the glass substrate 110 under non-ion blocking conditions, which means ions can freely pass through the surface of the glass substrate at the interface during thermal poling. In such embodiments, one or more of the electrodes are formed from a material that is substantially non-ion blocking, such as graphite. Thermal poling under non-ion blocking conditions facilitates easy separation of the electrodes after processing without complex removing steps.

In one or more embodiments, thermal poling includes applying the alternating electrical potential difference (voltage) in the range from about 50 volts to about 10,000 volts (e.g., from about 100 volts to about 1,000 volts or from about 200 volts to about 300 volts) to the glass substrate for a duration in the range from about 1 second to about 6 hours (e.g., from about 30 seconds to about 3 hours, from about 1 minute to about 5 minutes, from about 5 minutes to about 60 minutes, from about 15 minutes to about 30 minutes). It should be noted that thermal poling treatment times and potentials can vary depending on the glass composition. Thermal poling treatment times and potential can also vary depending the selected working frequency or working frequency range for the repeating duty cycle.

In one or more embodiments, the total number of polarity-reversal cycles for either time-varying DC waveforms or AC waveforms can be selected to achieve a predetermined level of completeness toward a target steady-state thickness of each of the opposing alkali-depleted regions for a given combination of glass substrate and voltage. For example, it can be preferred to achieve a maximal thickness of the opposing alkali-depleted regions by using longer thermal treatment times (greater number of cycles). Additionally, or alternatively, to enhance process throughput, it can be preferred to reduce thermal treatment times (fewer number of cycles), which can result in a steady-state thickness of each of the opposing alkali-depleted regions that is less than the maximal achievable thickness.

In one or more embodiments, the alternating electrical potential difference applied to the glass substrate 110 using pulsed DC waveforms or AC waveforms can include a DC offset towards one side of the glass substrate 110. In this configuration, both sides of the glass substrate 110 are thermal poled to a certain extent, but one side of the glass substrate 110 (i.e., the side on which the DC offset is directed) is subjected to preferential thermal poling. The preferential thermal poling can cause the thickness of one of the opposing alkali-depleted regions 114, 116 (on the same side on which the DC offset is directed) to be greater than the thickness of the other of the opposing alkali-depleted regions 114, 116 (on the opposite side on which the DC offset is directed). In some embodiments, the preferential thermal poling can also cause differences in the concentrations of mobile alkali within the opposing alkali-depleted regions 114, 116. For example, the preferential thermal poling can cause the mobile alkali concentration within one of the opposing alkali-depleted regions 114, 116 (on the same side on which the DC offset is directed) to be less than the mobile alkali concentration within the other of the opposing alkali-depleted regions 114, 116 (on the opposite side on which the DC offset is directed).

In one or more embodiments, the alternating electrical potential difference applied to the glass substrate 110 using pulsed DC waveforms or AC waveforms (with or without DC offset) has a voltage that can be increased as a function of time. In this configuration, the thermal poling can cause the respective thicknesses of the opposing alkali-depleted regions 114, 116 to be greater than the thicknesses that would otherwise be formed without such increase in total voltage as a function of time. In some embodiments, the increase in voltage over time can be applied in a manner that is stepped up in one or more discrete intervals over a time period. The time period in some embodiments can be a fixed time period. In other embodiments, the time period can vary such that the time period increases and/or decreases over the total thermal poling time. In some embodiments, the increase in voltage over time can be applied in a manner that is ramped up linearly as a function of time. In some embodiments, the increase in voltage over time can be applied in a manner that is ramped up in a non-linear fashion as a function of time such that there is a greater increase in voltage at earlier times and a reduced increase in voltage at later times.

One advantage of applying the alternating electrical potential difference with an increase in voltage over time includes an ability to maximize the respective thicknesses of the opposing alkali-depleted regions 114, 116 while also reducing total process time. The various approaches also have an advantage in avoiding thermal dielectric breakdown with the passage of too much current through the glass substrate, especially with low-resistivity glasses, allowing for higher final poling voltages and thicker opposing alkali-depleted regions 114, 116. Alternatively, as breakdown strength varies with glass composition, surface condition, and ambient temperature, an "instant-on" strategy for applying the alternating electrical potential difference can also be tolerated under some conditions for convenience.

After thermal poling treatment, the glass substrate 110 can be cooled to a temperature in the range from about 25° C. to about 80° C. for subsequent handling. The alternating electrical potential difference can be removed prior to cooling or after cooling.

Figure 4:
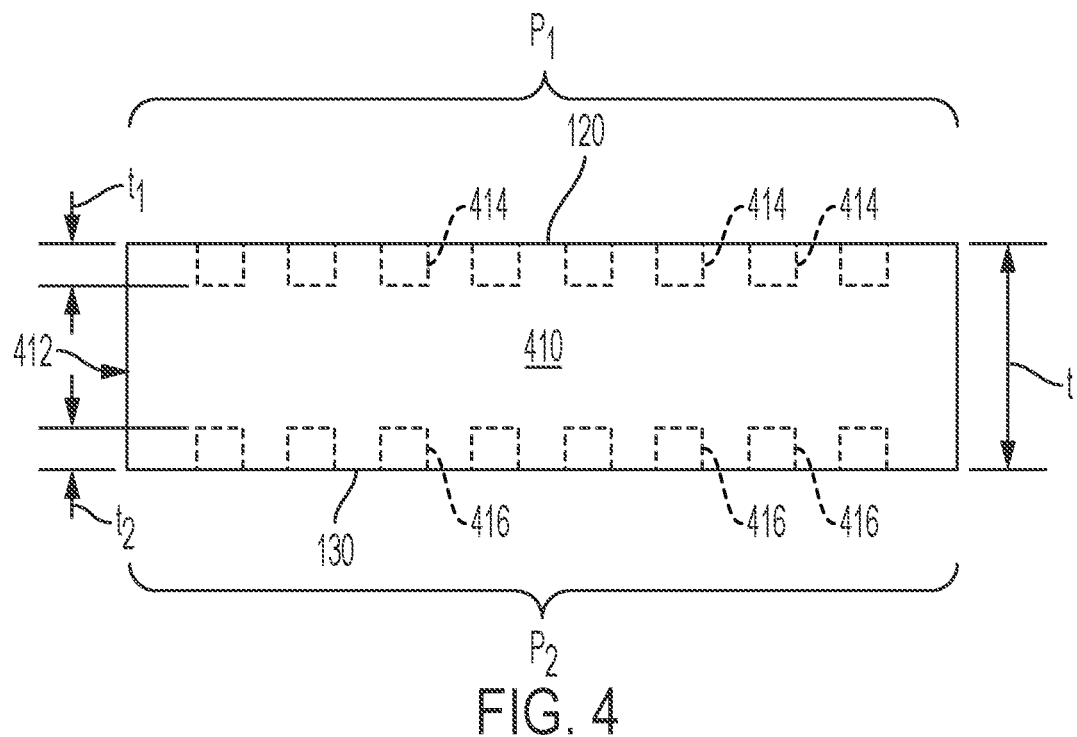
FIG. 4 is a side view of a glass substrate according one or more embodiments.

FIG. 4 is a side view of another glass substrate 410 according to the present disclosure. The glass substrate 410 includes an alkali-containing bulk 412, at least one first alkali-depleted region 414, and at least one second alkali-depleted region 416. The first alkali-depleted region 414 extends into the alkali-containing bulk 412 from a first surface 120 of the glass substrate 410. The second alkali-depleted region 416 extends into the alkali-containing bulk 412 from a second surface 130 of the glass substrate 110. The first surface 120 and the second surface 130 are on opposite sides of the glass substrate 410 in the embodiments shown in the figures. The glass substrate 410 of FIG. 4 possesses essentially the same compositional, structural, and electrical attributes as the glass substrate 110 of FIG. 1 except as described below.

In one or more embodiments, as shown in FIG. 4, the first alkali-depleted region is a plurality of first alkali-depleted regions 414 that are spaced apart from one another. In one or more embodiments, as shown in FIG. 4, the second alkali-depleted region is a plurality of second alkali-depleted regions 416 that are spaced apart from one another. In some embodiments, at least one first alkali-depleted region of the plurality of first alkali-depleted regions 414 is substantially aligned with at least one second alkali-depleted region 416 of the plurality of second alkali-depleted regions 416 when viewed in a thickness direction oriented approximately perpendicular to the first and second surfaces 120, 130.

In embodiments that include the respective pluralities of the first alkali-depleted regions 414 and the second alkali-depleted regions 416, first portions of the alkali-containing bulk 412 are disposed between adjacent pairs of the first alkali-depleted regions 414, and second portions of the alkali-containing bulk 412 are disposed between adjacent pairs of the second alkali-depleted regions 416. The alkali-containing bulk 412 also has third portions that are disposed between the substantially aligned pairs of the first and second alkali-depleted regions when viewed in the thickness direction.

In one or more embodiments, the plurality of first alkali-depleted regions 414 can have any lateral spacing therebetween. Similarly, the plurality of second alkali-depleted regions 416 can have any lateral spacing therebetween. The first alkali-depleted regions 414 and the second alkali-depleted regions 416 can have a cross-sectional shape when viewed in a plane oriented normal to the thickness direction and passing through the regions. The cross-sectional shape, according to various aspects, can have a shape chosen from circles, squares, rectangles, diamonds, triangles, hexagons, and other polygons, to name a few. The cross-sectional shape can have any size without limitation. In some embodiments, the size of the cross-sectional shape remains constant along the thickness direction over the thicknesses $t_1$, $t_2$ of the opposing alkali-depleted regions 414, 416. In other embodiments, the size of the cross-sectional shape can vary along the thickness direction.

In one or more embodiments, the plurality of first alkali-depleted regions 414 defines a first pattern $P_1$ on the first surface 120. The first pattern $P_1$ in some embodiments is a regular, repeating, or periodic pattern; an engineered, designed, or hierarchical pattern; an irregular, random, pseudo-random, or aperiodic pattern; or any combination thereof. In one or more embodiments, the plurality of second alkali-depleted regions 416 defines a second pattern $P_2$ on the second surface 130. The second pattern $P_2$ in some embodiments is a regular, repeating, or periodic pattern; an engineered, designed, or hierarchical pattern; an irregular, random, pseudo-random, or aperiodic pattern; or any combination thereof.

In one or more embodiments, the first alkali-depleted region is a first alkali-depleted surface layer 114 (FIG. 1) and the second alkali-depleted region is plurality of second alkali-depleted regions 416 (FIG. 4).

Figure 5:
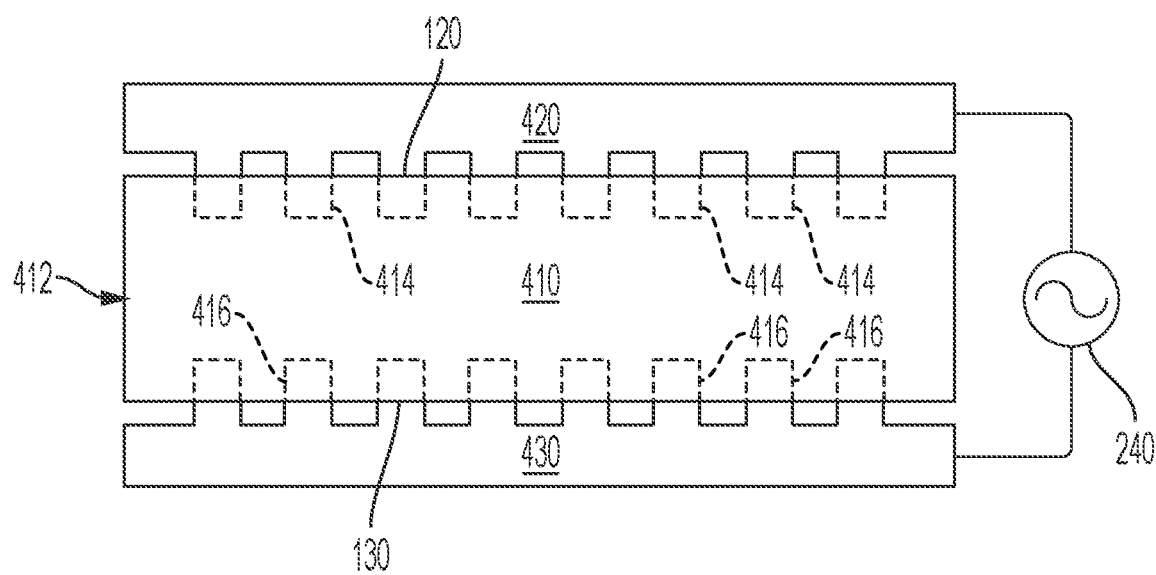
FIG. 5 is a side view of modified surface regions formed in opposing surfaces of the glass substrate of FIG. 4 during a thermal poling process according to one or more embodiments.

FIG. 5 is a diagrammatic side view of another embodiment of an electrode configuration for thermal poling the glass substrate 410 according the method described above. As shown, thermal poling can include contacting a first electrode 420 to the first surface 120 of the glass substrate 410 and contacting a second electrode 430 to the second surface 130 of the glass substrate 410. Once the first electrode 420 and the second electrode 430 are positioned on the glass substrate 410, thermal poling further includes applying an alternating electrical potential difference 240 to the glass substrate 410 such that the first electrode 420 and the second electrode 430 are alternatingly positively-biased relative to the glass substrate 410. The alternating positive-bias of the first electrode 220 and the second electrode induces alkali depletion in the at least one first region 414 and the at least one second region 416, respectively. The first electrode 420 and the second electrode 430 of FIG. 5 possess essentially the same compositional, structural, and electrical attributes as the first electrode 220 and the second electrode 230 of FIGS. 2 and 3, respectively, except as described below.

In embodiments in which the first alkali-depleted region is a plurality of first alkali-depleted regions 414, the first electrode 420 can have a plurality of first portions configured to contact respective portions of the first surface 120 corresponding to the first alkali-depleted regions 414. Thermal poling in these embodiments includes simultaneously reducing the concentration of alkali in each of the spaced-apart first alkali-depleted regions 414. Similarly, in embodiments in which the second alkali-depleted region is a plurality of second alkali-depleted regions 416, the second electrode 430 has a plurality of second portions configured to contact respective portions of the second surface 130 corresponding to the second alkali-depleted regions 416. Thermal poling in these embodiments includes simultaneously reducing the concentration of alkali in each of the spaced-apart second alkali-depleted regions 416.

The different strategies for applying the alternating electrical potential difference to the glass substrate 110 using a pulsed DC waveform or an AC waveform, as described with reference to FIGS. 2 and 3, apply to the thermal poling of the glass substrate 410, particularly with regard to the use of these strategies to control the thicknesses $t_1$, $t_2$ of the opposing alkali-depleted regions 414, 416. It will be appreciated that in some embodiments, all the first alkali-depleted regions 414 are formed to approximately same first thickness $t_1$. Similarly, in some embodiments, all the second alkali-depleted regions 416 are formed to approximately same second thickness $t_2$. In some embodiments, the first and second thicknesses $t_1$, $t_2$ can be the same. The first and second thicknesses $t_1$, $t_2$ in other embodiments can be different.

In one or more embodiments, the thicknesses $t_1$ of the first alkali-depleted regions 414 can be controlled individually such that the thickness $t_1$ of at least one of the first alkali-depleted regions 414 is different than the thickness $t_1$ of at least one other of the first alkali-depleted regions 414 by a minimum amount (e.g. 2.5%, 5%, 10%, 20%, 50%, 100%, or 200%). Similarly, the thicknesses $t_2$ of the second alkali-depleted regions 416 can be controlled individually such that the thickness $t_2$ of at least one of the second alkali-depleted regions 416 is different than the thickness $t_2$ of at least one other of the second alkali-depleted regions 416 by a minimum amount (e.g. 2.5%, 5%, 10%, 20%, 50%, 100%, or 200%).

Figure 6:
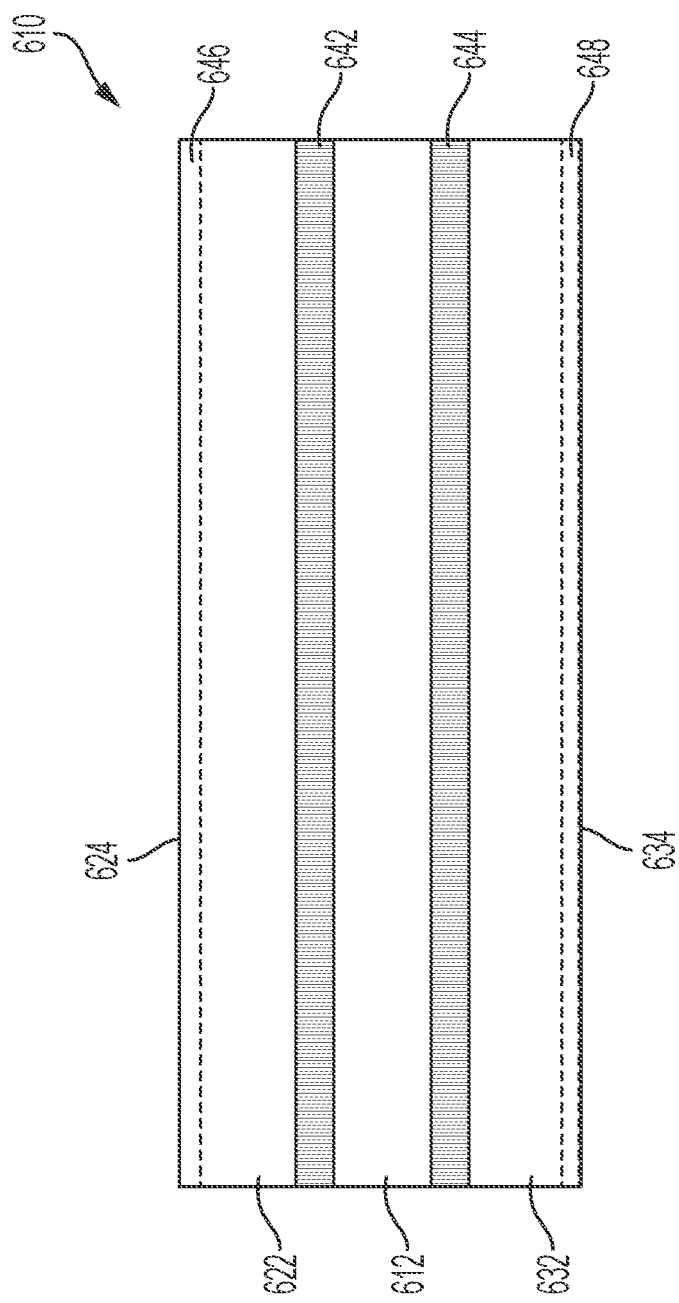
FIG. 6 is side view of a glass laminate according to one or more embodiments.

FIG. 6 is a side view of a glass laminate 610 formed by stacking a plurality of parent glasses and then thermal poling the stacked parent glasses according to the method of the present disclosure. The stacked parent glasses include a first parent glass 612, a second parent glass 622 positioned on a first surface (top surface as viewed in FIG. 6) of the first parent glass 612, and a third parent glass 632 positioned on a second surface (bottom surface as viewed in FIG. 6) of the first parent glass 612. Once the parent glasses 612, 622, and 632 are stacked, a pair of electrodes can be brought into contact with a third surface 624 of the second parent glass 622 and a fourth surface 634 of the third parent glass 632. The stack of parent glasses is then subjected to thermal poling using any one or more of the different strategies for applying the alternating electrical potential difference, as described with reference to reference to FIGS. 2 and 3.

During thermal poling of the stack of parent glasses, a first intermediate layer 642 forms between the first parent glass 612 and the second parent glass 622 and a second intermediate layer 644 forms between the first parent glass 612 and the third parent glass 632. The first and second intermediate layers 642, 644 comprise new glass compositions as a result of thermal poling. In one or more embodiments, the surfaces between the first and second parent glasses 612, 622 and/or the surfaces between the first and third parent glasses 612, 632 can be pretreated with a film of oxidizable metal or semiconductor material to increase bond strength or pre-leach the glass surface(s) so as to concentrate the externally applied alternating electrical potential difference. Additionally, during thermal poling of the stack of parent glasses, a first alkali-depleted layer 646 forms in the second parent glass 622 and a second alkali-depleted layer 648 forms in the third parent glass 632. The first and second alkali-depleted layers 646, 648 define silica rich layers of the second and third parent glasses. In one or more embodiments, the second and third parent glasses 622, 632 have the same glass composition while the first parent glass 612 has a different glass composition.

Figure 7:
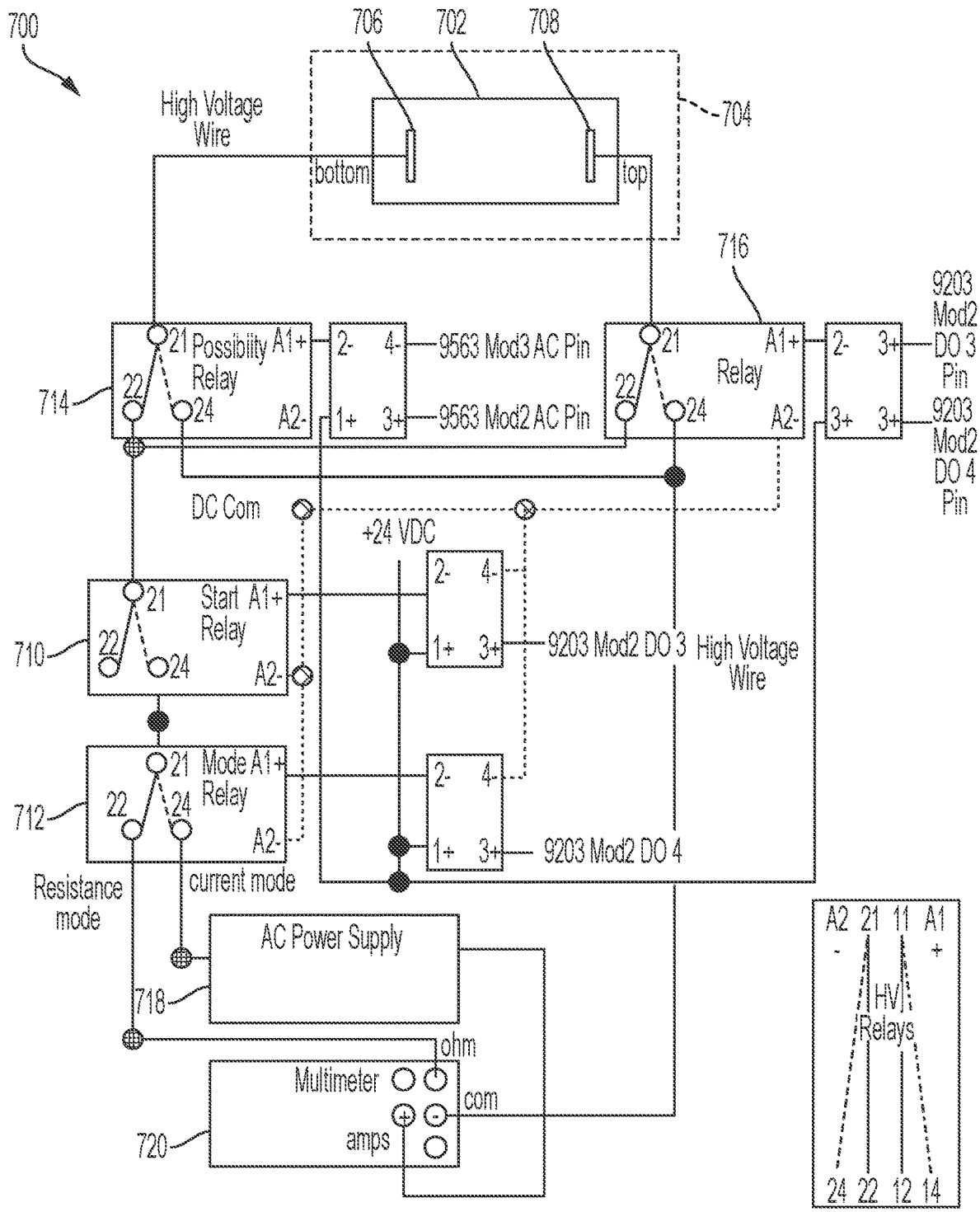
FIG. 7 is a schematic diagram of a thermal poling system configured to apply alternating electric fields to a glass substrate using a time-varying direct current (DC) waveform.

A third aspect of this disclosure pertains to a thermal poling system, according to one or more embodiments, configured to provide alternating electric fields to a glass substrate according to the method described herein. FIG. 7 is a schematic representation of a thermal poling system 700 configured to provide alternating electric fields to a glass sample 702 using a time-varying or pulsed DC waveform. The thermal poling system 700 includes a furnace 704 configured to heat the glass sample 702, such as the glass substrate 110 (FIGS. 1-3), the glass substrate 410 (FIGS. 4 and 5), and/or the glass laminate 610 (FIG. 6), to a thermal poling temperature below the glass transition temperature ($T_g$) of the glass sample 702.

The thermal poling system 700 also includes a pair of electrodes 706, 708 configured to contact the glass sample 702 at the thermal poling temperature. The furnace 704 in some embodiments surrounds the electrodes 706, 708 and the glass sample 702. In some embodiments, thermal poling is carried out in air atmosphere. In other embodiments, the furnace provides a seal (e.g., partial, substantial, or hermetic seal) to enable an alternative atmosphere for thermal poling.

The thermal poling system 700 further includes circuit components such as a start relay 710, a mode relay 712, a set of polarity relays 714, 716, a power supply 718, at least one data acquisition (DAQ) module, and a multimeter 720. The circuit components have operative connections to one another and the glass sample 702, as shown in FIG. 7.

In one or more embodiments, the power supply 718 is a 0 to 600 vdc power supply (e.g., 0 to 300 vdc power supply or 0 to 10,000 vdc power supply) configured to be controlled via universal serial bus (USB) communications. The DAQ module is configured to provide digital and analog inputs and outputs. The multimeter 720 is configured for both current and resistance measurements, and the input connections to the multimeter are configured to be controlled through the mode relay 712. The start relay 710 is configured to precisely trigger the start of a measurement sequence.

The polarity relays 714, 716 enable the switching of the DC positive and common lines to be switched at the glass sample 702 without shorting. In some embodiments, the polarity relays 714, 716 are configured to change polarity using a frequency in a range from about 0.01 Hz to about 500 Hz. The time-varying DC waveform generated by the thermal poling system 700 is a square waveform output. The thermal poling system 700 applies the alternating electrical potential difference to the glass sample 702 using the time-varying DC waveform according to the different strategies described with reference to FIGS. 1 and 2. The thermal poling voltage can be selected to uniformly or preferentially treat opposite surfaces of glass sample 702.

The frequency selected for thermal poling with the thermal poling system 700 can be tuned for the electrical properties associated with each glass sample to be treated. The working frequency range should be lower than the frequency regime associated with DC conduction of glass, which is frequency independent. This regime can be measured with using known electrical impedance spectroscopy equipment. The measured charge or integral of current per half-cycle determines how much ionic migration occurs at each surface of the glass sample. The thermal poling system 700 is configured for a quick sample exchange to quench the glass sample in temperature and retain the thermal poled alterations. The thermal poling system 700 in some embodiments is configured to control the process atmosphere within the furnace 704 (e.g., under vacuum, in an inert gas environment such as dry $N_2$, or permeable gas environment) to minimize atmosphere effects and/or occluded gas at the interface and manage and/or mitigate ionic injections into the glass sample from the atmosphere such as hydrogen and hydronium ions.

Figure 8:
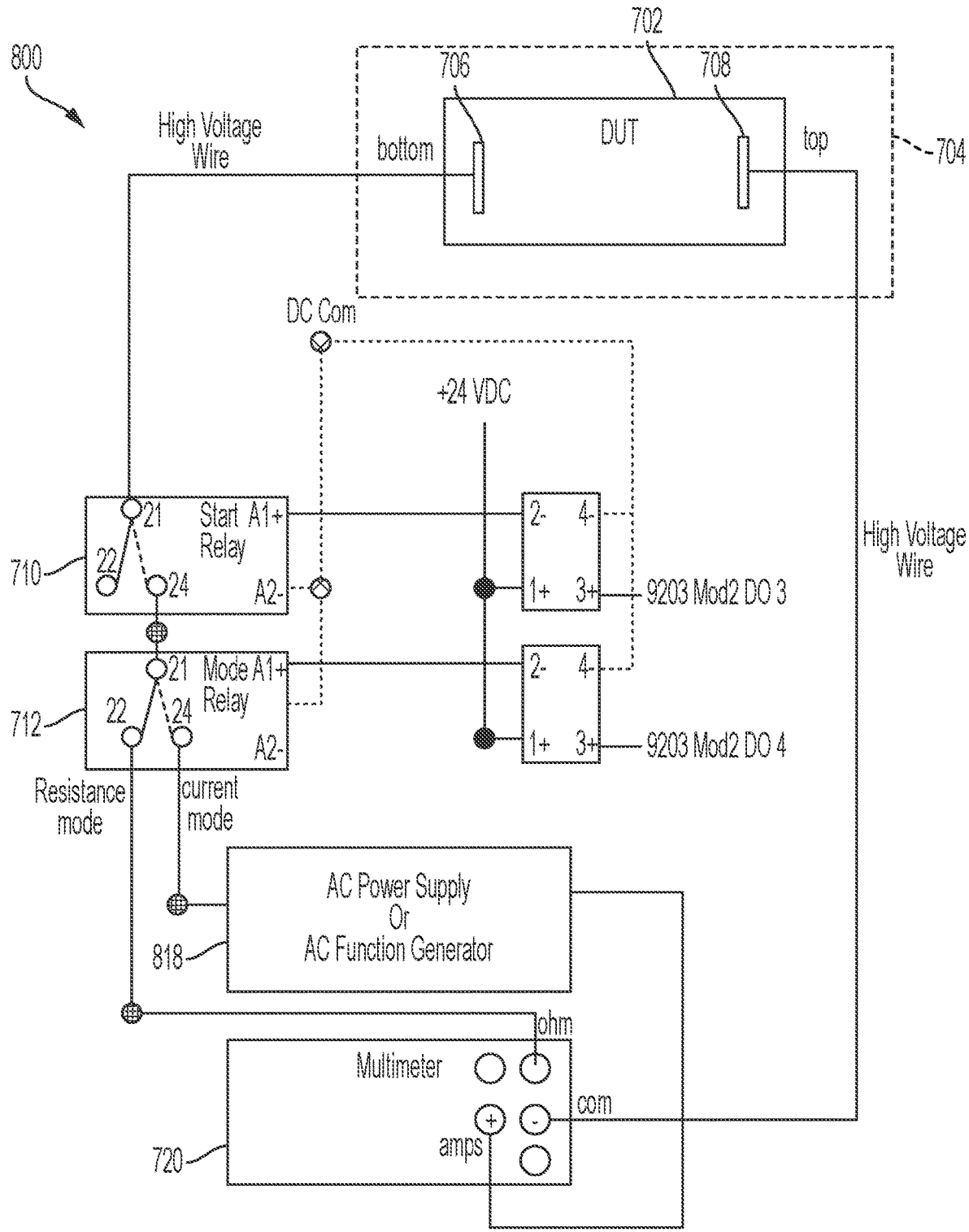
FIG. 8 is a schematic diagram of a thermal poling system configured to apply alternating electric fields to a glass substrate using an alternating current (AC) waveform.
Figure 9:
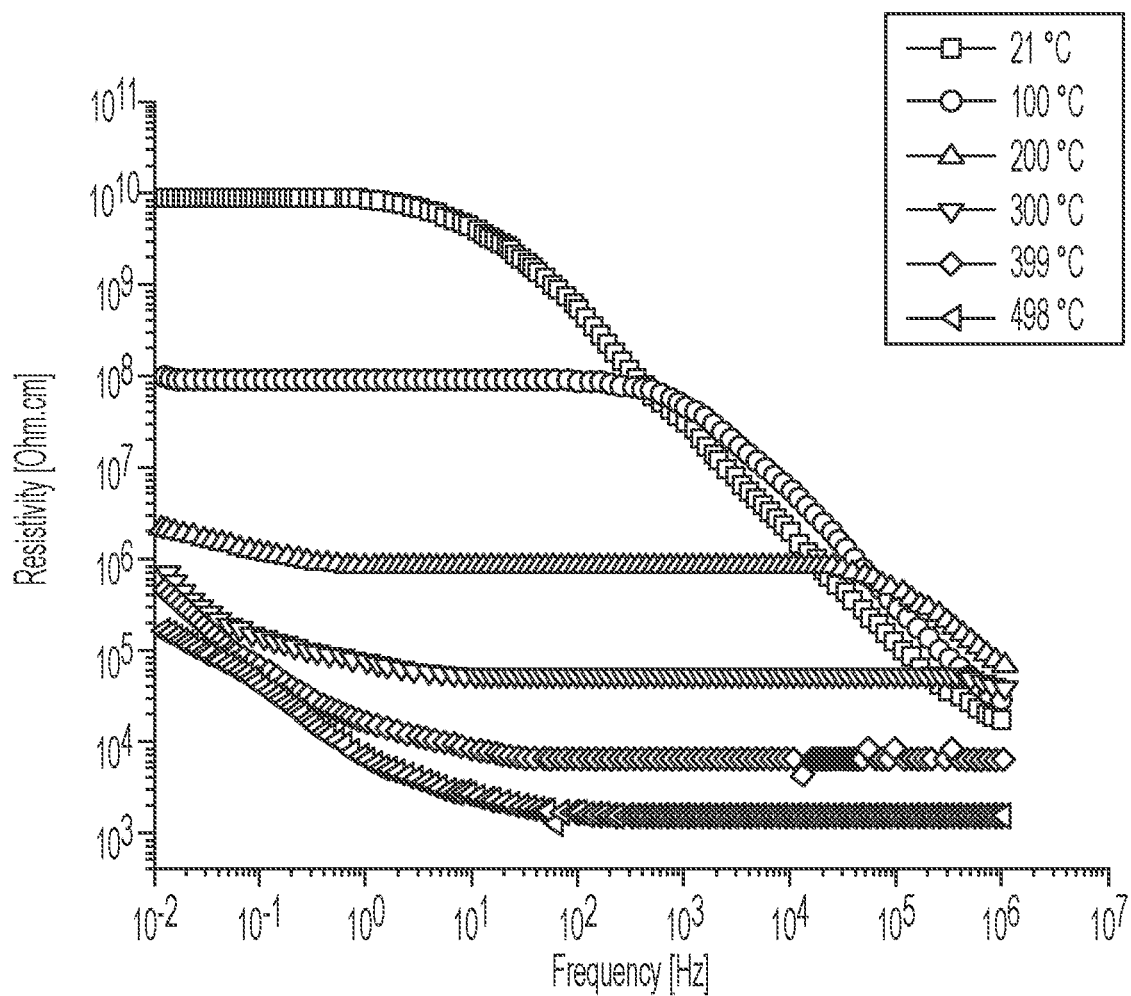
FIG. 9 is a graph of measured electrical resistivity versus frequency at different temperatures for the glass substrate of the Example.

FIG. 8 is a schematic representation of a thermal poling system 800 configured to provide alternating electric fields to the glass sample 702 using an AC waveform. The thermal poling system 800 of FIG. 8 is similar to the thermal poling system 700 of FIG. 7 except that the power supply 818 of the thermal poling system 800 can be an AC power supply or AC function generator. The AC waveforms generated by the thermal poling system 800 can include any oscillating electric field such as sinusoidal, sawtooth, triangular, etc. The duty cycle of the AC waveform can be controlled if asymmetry in the thicknesses of the opposing alkali-depleted regions is desired. The thermal poling system 800 does not include polarity relays. The thermal poling system 800 applies the alternating electrical potential difference to the glass sample 702 using the AC waveform according to the different strategies described with reference to FIGS. 1 and 2.

EXAMPLE

The following example further clarifies the various embodiments disclosed herein.

A glass sample was prepared from a precursor (or parent) glass having a composition that includes 76.1 mol % $SiO_2$, 5.2 mol % $Al_2O_3$, 11.8 mol % $Na_2O$, 0.03 mol % CaO, 0.05 mol % $Fe_2O_3$, 6.7 mol % MgO, and 0.01 mol % $SnO_2$. The glass sample was polished into a planar coupon having dimensions from about 2 inches by 2 inches square cross section with 1.1 mm thickness. The glass surface was prepared by coating with a graphite paint on the top and bottom major surfaces. The glass was placed in contact between two graphite blocks used as non-ion blocking electrodes.

A working frequency range was identified for thermal poling the glass sample using an AC waveform configured as a 50/50 duty cycle sinusoidal wave. This AC waveform configuration exposes each side of the glass sample to similar electric fields and times for substantially symmetric formation of the opposing alkali-depleted regions. The frequency (or frequency range) for the AC waveform is selected based on the electrical properties of the glass. FIG. 7 is a graph that illustrates the temperature dependence of electrical resistivity versus frequency for the composition of the glass sample. Working frequency ranges that are useful for AC thermal poling are to the left side of the figure. The guideline is to pick a frequency (or frequency range) below the frequency independent region (e.g., the substantially flat portion of the plot line) for the glass composition and its respective temperature. For example, thermal poling the glass sample at a frequency of 1 Hz would form opposing alkali-depleted regions at 300° C., but not at 200° C.

The glass sample was installed in a thermal poling system configured in essentially the same manner as the thermal poling system 700 described with reference to FIG. 7. The glass sample was subjected to thermal poling using a pulsed DC waveform alternating at a frequency of 0.1 Hz at a voltage of 200V over a thermal poling time of 5 minutes. The thermal poling temperature was set at 300° C.

Figure 10:
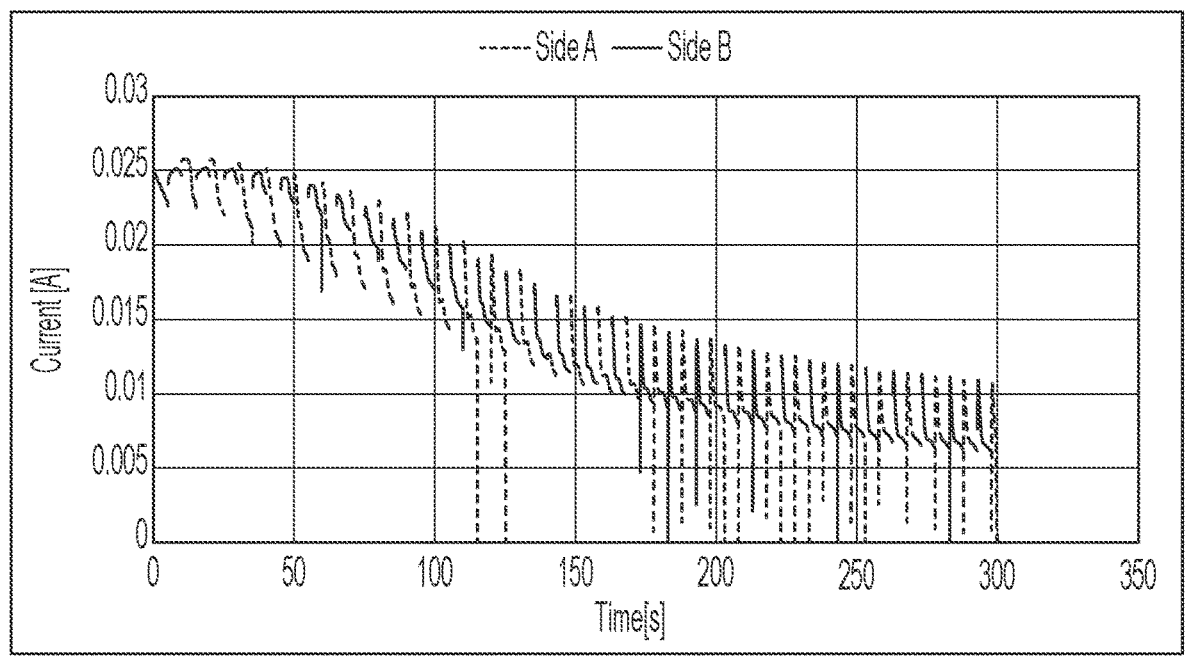
FIG. 10 is a graph of current versus poling time for each side of the glass substrate of the Example during a thermal poling process according to one or more embodiments.

FIG. 10 is a graph that illustrates the current measured at each side of the glass sample during thermal poling according to the noted parameters. As illustrated, the total charge on both sides of the glass sample were equivalent after 5 minutes of thermal poling.

Figure 11:
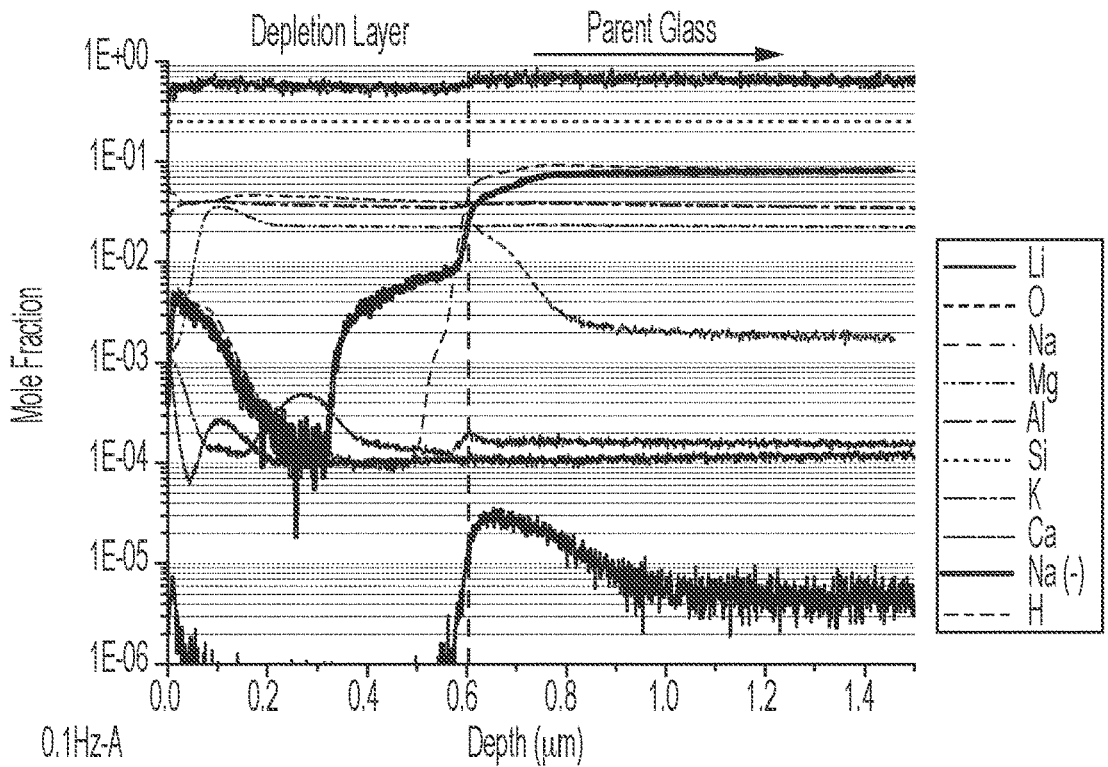
FIG. 11 shows secondary-ion-mass-spectrometry (SIMS) depth profiles for certain elements through a side of the glass substrate of the Example after the thermal poling process of FIG. 10.
Figure 12:
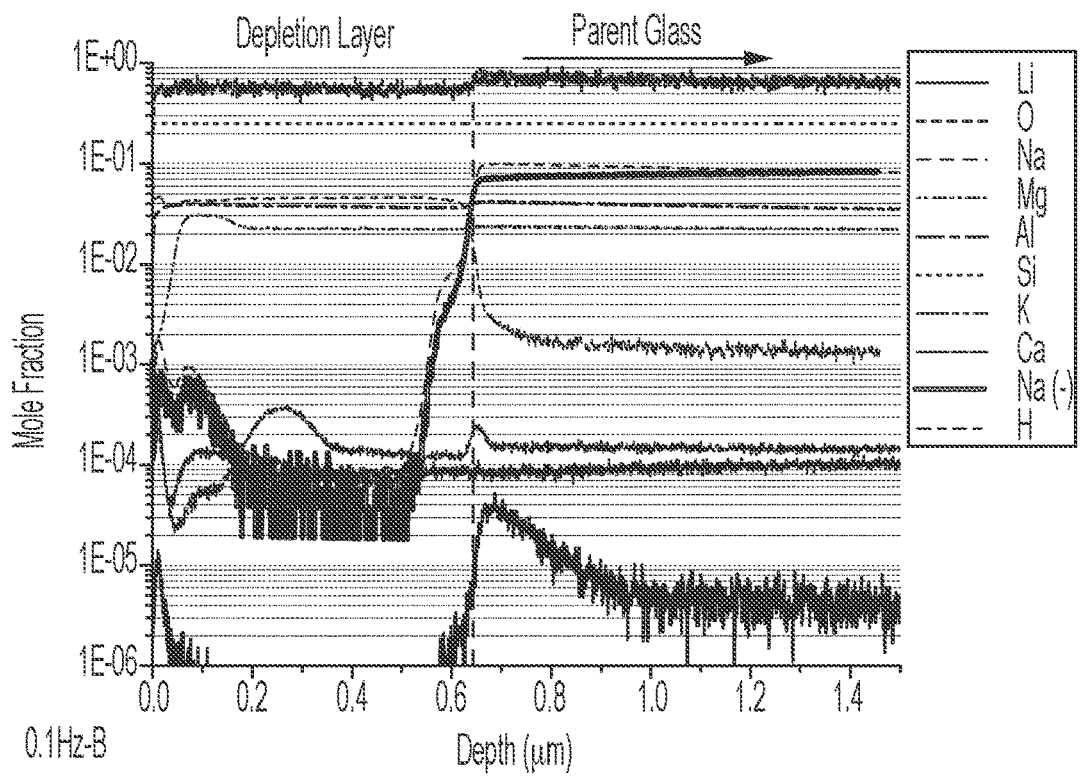
FIG. 12 shows SIMS depth profiles for the same elements of FIG. 11 through an opposite side of the glass substrate of the Example after the thermal poling process of FIG. 10.

FIGS. 11 and 12 show secondary-ion-mass-spectrometry (SIMS) depth profiles for selected elements from a first side (FIG. 11) and a second side (FIG. 12) of the glass sample after thermal poling according to the noted parameters. As shown in the figures, an alkali-depleted surface layer was formed to similar depths on both sides of the glass sample. The region nearest the electrode on each side shows a significant change in composition compared to the bulk. The most prominent change in composition is the concentration of sodium ions ($Na^+$). This change in composition related to $Na^+$ is mirrored closely by the composition modification of trace lithium ions with the bulk. Nearest the electrode on each side, a thin skin layer (approximately 100 nm) is devoid of almost all alkali and alkaline earth ions. The skin layer is then followed in depth by the presence of $K^+$, $Mg^{2+}$, and $Ca^{2+}$ within a $Na^+$ depleted layer. This $Na^+$ depleted layer makes up most of the alkali-depleted surface layer. Relative to the bulk, the alkali-depleted surface layer is silica-rich in volumetric concentration.

The thickness of each alkali-depleted surface layer is taken as the distance measured from the surface of the glass sample on the same side as the alkali-depleted surface layer to the approximate position in which the concentration of Na+ is about 50% of its concentration through the bulk. FIG. 11 shows a first alkali-depleted surface layer on the first side has a thickness of approximately 630 nm. FIG. 12 shows a second alkali-depleted surface layer on the second side has a thickness of approximately 645 nm. As will be appreciated by comparing FIGS. 11 and 12, the network and/or composition of the alkali-depleted surface layers after thermal poling is much different than that of the bulk glass. Without being bound by theory, it is believed that the changes to the alkali-depleted surface layers during thermal poling include the removal of $Na_2O$ from the molar-oxide composition of the glass sample. In other words, both Na and its corresponding 0 are removed from the atom % composition during thermal poling. The oxides remaining in the alkali-depleted surface layers after thermal poling, after renormalizing the mole % oxide composition back to 100%, will shown a network that is much different than that of the bulk glass.

Further with respect to the network and/or composition of the alkali-depleted surface layers after thermal poling, it will be appreciated that since oxygen can exit the glass sample during thermal poling, for example under non-ion blocking conditions, there is no collection of oxygen at the surfaces of the liberated glass sample after processing. In other words, the alkali-depleted surface layers formed after thermal poling do not have an interfacial oxide.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:
1. A method of forming a glass substrate with modified surface regions, comprising:
   providing a glass substrate having a concentration of alkali and opposing surfaces that include a first surface and a second surface;
   reducing the concentration of alkali in at least one first region extending for a first thickness from the first surface via thermal poling and, near-simultaneously, reducing the concentration of alkali in at least one second region extending for a second thickness from the second surface via thermal poling,
   wherein, after thermal poling, each of the at least one first region and the at least one second region has a substantially homogenous composition,
   wherein thermal poling comprises contacting a first electrode to the first surface, contacting a second electrode to the second surface, and applying an alternating electrical potential difference to the glass substrate such that the first and second electrodes are alternatingly positively-biased relative to the glass substrate to induce alkali depletion in the at least one first and second regions, respectively,
   wherein applying an alternating electrical potential difference to the glass substrate comprises using an alternating current (AC) waveform, wherein using the (AC) waveform includes increasing a total voltage to the first and second electrodes as a function of time, and wherein the AC waveform defines a duty cycle with a first half cycle in which the first electrode is positively biased and a second half-cycle in which the second electrode is positively biased, the duty cycle controlled to induce asymmetry between the first thickness and the second thickness.

2. The method of claim 1, wherein the AC waveform has a working frequency in a range that corresponds to an electrode polarization regime of the glass substrate.

3. The method of claim 1, wherein increasing a total voltage to the first and second electrodes further includes one or more of stepping up the total voltage in discrete intervals over a period of time and ramping up the total voltage in a linear manner as a function of time.

4. The method of claim 1, wherein thermal poling comprises heating the glass substrate to a temperature below a glass transition temperature (Tg) of the glass substrate prior to applying the alternating electrical potential difference to the glass substrate.

5. The method of claim 1, wherein thermal poling is performed under vacuum, in an inert gas environment, or in a permeable gas environment.

6. The method of claim 1, wherein a material of at least one of the first electrode and the second electrode is selected from carbon, stainless steel, one or more noble metals, one or more oxidation-resistant, conductive films, or combinations thereof.

7. The method of claim 1, wherein thermal poling comprises contacting a first portion of the first electrode to a portion of the first surface corresponding to the at least one first region and contacting a second portion of the second electrode to a portion of the second surface corresponding to the at least one second region.

8. The method of claim 7, further comprising, while reducing the concentration of alkali in the at least one first region, simultaneously reducing the concentration of alkali in at least one third region extending from the first surface via thermal poling, the at least one third region spaced from the at least one first region.

9. The method of claim 8, wherein thermal poling comprises contacting a third portion of the first electrode to a portion of the first surface corresponding to the at least one third region, the first and third portions of the first electrode spaced apart from one another.

10. The method of claim 1, wherein increasing a total voltage to the first and second electrodes includes ramping up the total voltage in a non-linear manner as a function of time.

* * * * *